(12) United States Patent
Sharma et al.

(10) Patent No.: US 7,266,816 B1
(45) Date of Patent: Sep. 4, 2007

(54) METHOD AND APPARATUS FOR UPGRADING MANAGED APPLICATION STATE FOR A JAVA BASED APPLICATION

(75) Inventors: Rahul Sharma, San Jose, CA (US); Vladimir Matena, Redwood City, CA (US); Masood Mortazavi, Cupertino, CA (US); Sanjeev Krishnan, Cupertino, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 636 days.

(21) Appl. No.: 09/846,067

(22) Filed: Apr. 30, 2001

(51) Int. Cl.
G06F 9/44 (2006.01)

(52) U.S. Cl. .................. 717/170; 717/120; 717/169

(58) Field of Classification Search ................ 717/168, 717/169, 170, 171, 173, 126, 120; 707/102; 709/204, 219, 249; 719/328
See application file for complete search history.

(56) References Cited

U.S. PATENT DOCUMENTS

| | | | | |
|---|---|---|---|---|
| 5,920,725 | A * | 7/1999 | Ma et al. ..................... | 717/171 |
| 6,175,855 | B1 * | 1/2001 | Reich et al. ................. | 709/202 |
| 6,182,086 | B1 | 1/2001 | Lomet et al. | |
| 6,272,677 | B1 * | 8/2001 | Lam et al. ................... | 717/170 |
| 6,298,478 | B1 * | 10/2001 | Nally et al. ................. | 717/170 |
| 6,360,363 | B1 * | 3/2002 | Moser et al. ................ | 717/170 |
| 6,457,065 | B1 * | 9/2002 | Rich et al. .................. | 719/328 |
| 6,662,217 | B1 * | 12/2003 | Godfrey et al. ............ | 709/219 |
| 6,684,387 | B1 * | 1/2004 | Acker et al. ................. | 717/126 |
| 6,760,812 | B1 * | 7/2004 | Degenaro et al. ........... | 711/133 |
| 6,802,061 | B1 * | 10/2004 | Parthasarathy et al. ..... | 717/173 |
| 6,879,995 | B1 * | 4/2005 | Chinta et al. ............... | 709/204 |
| 6,889,227 | B1 * | 5/2005 | Hamilton .................... | 707/102 |
| 6,944,680 | B1 * | 9/2005 | Lee et al. .................... | 709/249 |

OTHER PUBLICATIONS

Gopalan S. Raj, "A Detailed Comparison of CORBA, DCOM and JAVA/RMI", Sep. 1998 (13 pages). [Online] [Retrieved at] <http://my.execpc.com/~gopalan/misc/compare.html> on Feb. 13, 2006.*
Gopalan S. Raj, "Detailed Comparison of Enterprise JavaBeans (EJB) & The Microsoft Transaction Server (MTS) Models", May 1999 (24 pages). [Online] [Retrieved at] <http://members.tripod.com/gsraj/misc/ejbmts/ejbmtscomp.html> on Feb. 13, 2006.*

(Continued)

*Primary Examiner*—Tuan Dam
*Assistant Examiner*—Thuy Dao
(74) *Attorney, Agent, or Firm*—Martine Penilla & Gencarella, LLP

(57) ABSTRACT

An invention is disclosed for performing online upgrades of applications, including the managed application state, without disrupting the functionality of the application during the upgrade process. A Java module is executed on a server, where the Java module includes at least one original entity bean and at least one original state object in communication with the original entity bean. The original state object stores a state of the original entity bean. Then, an upgraded state object is generated and the state stored in the original state object is transferred to the upgraded state object. In this manner, state management for the original entity bean can be provided using the upgraded state object.

17 Claims, 9 Drawing Sheets

OTHER PUBLICATIONS

"Enterprise JavaBeans Specification, v1.1", Sun Microsystems, Inc., Dec. 1999 (chapter 1-11 and 16-Index). [Online] [Retrieved at] <java.sun.com/products/ejb/docs.html>.*

"Read all about EJB 2.0", Monson-haefel, Jun. 9, 2000 (15 pages). Online retrieved at <www.javaworld.com/javaworld/jw-06-2000/jw-0609-ejb.html>.*

Anderson, "*A Deployment System for Pervasive Computing*", Dept. of Computer and Information Science, p. 262-270, 2000 IEEE, jesan@ida.liu.se.

Armstrong, "*How to Implement state-dependent behavior*", Java World, Aug. 1997, XP-002246628, JavaWorld.com.

Unknown, "*Cleaning Up Unused Objects*", XP-002249877, Aug. 1, 2001, The Java TM Tutorial, web.archive.org/web/2001...ava/data/garbagecollection.com.

Anderson and Ritzau, "*Dynamic Code Update in JDRUMS*", XP-002249737, Jun. 2000, School of Mathematicss and Systems Eng., Sweden, and Dept. of Computer and Information Service, Sweden.

Ritzau and Anderson, "*Dynamic Deployment of Java Applications*", The Embedded Systems Show, London, May 24-25, 2000, XP-002249738.

* cited by examiner

METHOD AND APPARATUS FOR UPGRADING MANAGED APPLICATION STATE FOR A JAVA BASED APPLICATION

CROSS REFERENCE TO RELATED APPLICATIONS

This application is related to (1) U.S. patent application Ser. No. 09/812,536, filed Mar. 19, 2001, and "Method and Apparatus for Providing Application Specific Strategies to a Java Platform including Start and Stop Policies," (2) U.S. patent application Ser. No. 09/812,537, filed Mar. 19, 2001, and entitled "Method and Apparatus for Providing Application Specific Strategies to a Java Platform including Load Balancing Policies," (3) U.S. patent application Ser. No. 09/833,845, filed Apr. 11, 2001, and entitled "Method and Apparatus for Performing Online Application Upgrades in A Java Platform," (4) U.S. patent application Ser. No. 09/833,856, filed Apr. 11, 2001, and entitled "Method and Apparatus for Performing Failure Recovery in a Java Platform," (5) U.S. patent application Ser. No. 09/818,214, filed Mar. 26, 2001, and entitled "Method and Apparatus for Managing Replicated and Migration Capable Session State for A Java Platform," (6) U.S. patent application Ser. No. 09/825,249, filed Apr. 2, 2001, and entitled "Method and Apparatus for Partitioning of Managed State for a Java based Application," and (7) U.S. patent application Ser. No. 09/846,492, filed Apr. 30, 2001, and entitled "Method and Apparatus for Migration of Managed Application State for a Java based Application." Each of the above related application are incorporated herein be reference.

BACKGROUND OF THE INVENTION

1. Field of the Invention

This invention relates generally to Java programming, and more particularly to methods for performing online upgrades to the managed state of Java based applications.

2. Description of the Related Art

Today's world of computer programming offers many high-level programming languages. Java, for example, has achieved widespread use in a relatively short period of time and is largely attributed with the ubiquitous success of the Internet. The popularity of Java is due, at least in part, to its platform independence, object orientation and dynamic nature. In addition, Java removes many of the tedious and error-prone tasks that must be performed by an application programmer, including memory management and cross-platform porting. In this manner, the Java programmer can better focus on design and functionality issues.

One particular Java environment is the Java 2 platform, Enterprise Edition (J2EE), which facilitates building Web-based and enterprise applications. Broadly speaking, J2EE services are performed in the middle tier between the user's browser and the databases and legacy information systems. J2EE comprises a specification, reference implementation and a set of testing suites. J2EE further comprises Enterprise JavaBeans (EJB), JavaServer Pages (JSP), Java servlets, and a plurality of interfaces for linking to information resources in the platform.

The J2EE specifications define how applications should be written for the J2EE environment. Thus the specifications provide the contract between the applications and the J2EE platform. One aspect of the J2EE specification is the EJB 2.0 Container Managed Persistence (CMP). The EJB 2.0 specification defines a contract between an entity bean, its container and the persistence manager for the management of persistent state and relationships for the entity beans. For a complete specification of CMP, refer to the EJB 2.0 specification published by Sun Microsystems, Inc., which is incorporated by reference herein in its entirety.

According to the EJB programming model, a bean provider develops a set of entity beans for an application and specifies the relationships between these objects. For each entity bean, the bean provider specifies an abstract persistence schema, which defines a set of methods for accessing the container-managed fields and relationships for the entity bean. The container-managed fields and relationships of the abstract persistence schema are specified in the deployment descriptor defined by the bean provider.

The deployer uses the persistence manager provider tools to determine how persistent fields and relationships are mapped to the underlying persistence mechanism, such as, a database. The persistence manager tools also generate the additional classes and interfaces that enable the persistence manager to manage the persistent fields and relationships of the entity beans at the runtime. An advantage of container managed persistence is that the entity beans become logically independent of the underlying persistence mechanism. The CMP also leads to a simple programming mode for managing persistence.

An entity bean with container manager persistence includes its class, a remote or local interface that defines its client-view business methods, a home interface that defines create, remove, home and finder methods. The abstract persistence schema comprises a set of properties, each representing a field or relationship in the persistent state of entity bean. The entity bean defines a set of accessor (setter and getters) methods for the persistent fields and relationships.

The bean provider generally does not write any database access calls in the entity bean class. Instead, a persistence manager that is available to the container at runtime handles the persistence. The bean provider codes all persistent data access using the setter and getter methods defined for the container-managed persistent and relationship fields.

FIG. 1 is a diagram showing the tradeoffs that business and carrier grade applications have to make. The carrier grade applications, which are applications used in high-performance, high-traffic networks such as used by telecoms, service providers and ISPs, require higher performance and availability than business applications.

Carrier grade (CG) applications require high availability of the order of five 9's and better. A high availability environment is one in which a service or component has greater availability, usually due to component redundancy, than in some base environment. Typically the term is used to describe failover cluster environment in which a service is provided by a primary component, until after some failure, after which the secondary component takes over the provision of the service. The high availability requirement for carrier grade applications leads to a requirement for a carrier grade application to achieve prompt (two seconds or less) restart or failover to a secondary component with minimal disruption of service. Thus, the application has to become operational within minimal time after a failure.

A carrier grade application requires a shorter failover time as compared to the business applications, which typically store persistent state in a database to achieve ACID (Atomicity, Consistency, Isolation, Durability) properties for the managed state. Business applications rely on database-specific mechanisms to achieve state replication, thereby protecting persistent data from the failure of the primary database.

A typical database replication mechanism is database log replay. The database logs changes in a transaction log that is used for transaction replay in case of a failure. The log replay involves applying the transaction log to a replica database so that a near-mirror copy of primary database is created. Unfortunately, the time-delay in replaying the transaction log on the replica database slows down the failover. Moreover, a huge rate of inserts/updates may create huge transaction replay log, which further slows the transaction replay at the failure time.

Business applications also rely on parallel database servers to achieve state replication and failover. In case of parallel database servers, multiple active database engines, coordinated by a distributed lock manager, manage active replication. However, use of the distributed lock manager for coordinating database operations slows down the application performance. Hence, the use of a parallel database server is considered more suitable for read-only and read-mostly applications. With the short failover time requirement, a typical carrier grade application cannot rely on a database-based replication mechanism or a parallel database server to achieve state replication and failover.

Business applications typically need to maintain ACID properties for the data being used by the application. Such applications cannot afford any data inconsistency and thereby store persistent data in a database and use transactions. For business applications, the tradeoff between consistency and concurrency gets reflected in the choice of the database isolation level. The use of optimistic concurrency model as against pessimistic concurrency model is another design decision involved in the business applications as part of the consistency and concurrency tradeoff. Business applications also need a reliable and consistent database failover and recovery—these applications cannot afford any inconsistent data.

The carrier grade applications may have consistency and concurrency requirements that differ from the business applications. A carrier grade application may process multiple concurrent state transitions and may not require full ACID properties to be maintained for its managed state. For example, a CG J2EE application may need a fast failover and may afford to have the replica (now the new primary) take over in a state that is temporally inconsistent with the initial primary. The client using the carrier grade application should be able to bring the new primary into a consistent state by retrying transactions for state transitions. Moreover, there currently is no defined mechanism for online upgrades of software on a J2EE platform. Such upgrades require the system to continue providing services to clients while the system software upgrade is being performed.

In view of the forgoing, there is a need for systems and methods that manage state for applications that require high availability. The systems and methods should allow for state replication and provide high availability of the order of five 9's and better to carrier grade applications, and should further allow the managed state to be upgraded while the application continues to handle incoming requests.

SUMMARY OF THE INVENTION

Broadly speaking, the present invention fills these needs by providing an upgrading mechanism that allows online upgrades of state schemas, including the managed state, both application specific and session related state, without disrupting the functionality of a running application during the upgrade process. In one embodiment, a method for upgrading schema for a managed state for a Java based application is disclosed. A Java module is executed on a server, where the Java module includes at least one original entity bean and at least one original state object in communication with the original entity bean. The original state object (part of the representation of managed state schema) stores a state of the original entity bean. Then, an upgraded state object is generated and the state stored in the original state object is transferred to the upgraded state object. In this manner, state management for the original entity bean can be provided using the upgraded state object. In addition, an upgraded entity bean is made operational and the state of the upgraded entity bean is managed using the upgraded state object. Thereafter, both the original entity bean and the original state object can be disabled. In this manner, the functionality of the Java module is not disrupted when the upgrade of state schema is performed. Also, the functionality of the Java application is not disrupted when the Java module is upgraded.

In another embodiment, a Java platform capable of performing an online upgrade on a Java application is disclosed. The Java platform includes a Java module having at least one original entity bean and at least one original state object in communication with the original entity bean. The original state object stores a state of the original entity bean, and provides state management for the original entity bean. The Java platform also includes a repository having upgraded class files for the original entity bean and upgraded class files the original state object. The original state object is upgraded by generating an upgraded state object using upgraded class files from the repository, and transferring the state stored in the original state object to the upgraded state object. Further, the original entity bean can be upgraded by creating an upgraded entity bean. Then, the state of the upgraded entity bean can be managed using the upgraded state object, and both the original entity bean and the original state object can be disabled.

A method for upgrading a Java application having a managed application state is disclosed in a further embodiment of the present invention. A Java module is executed on a server, where the Java module includes at least one original entity bean and at least one original state object in communication with the original entity bean. As discussed above, the original state object stores a state of the original entity bean. Then, an upgraded state object is generated using data stored in a system repository, and the state stored in the original state object is transferred to the upgraded state object. State management for the original entity bean is then provided using the upgraded state object. Next, an upgraded entity bean is created using data stored in the system repository, and state management for the upgraded entity bean is provided using the upgraded state object. Thereafter, both the original entity bean and the original state object are disabled.

Advantageously, the embodiments of the present invention allow online upgrades to the managed state schema of a Java application. Further, the embodiments of the present invention allow upgrades to the application without disrupting the functionality of the application during the online upgrading process. As a result, applications executing on the Java system of the embodiments of the present invention can, in some embodiments, achieve continuous availability, on the order of about 99.9999% uptime or better. Other aspects and advantages of the invention will become apparent from the following detailed description, taken in conjunction with the accompanying drawings, illustrating by way of example the principles of the invention.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE PREFERRED EMBODIMENTS

An invention is disclosed for systems and methods that provide online upgrading of the schema of managed state for Java based applications, including applications requiring high availability. To this end, embodiments of the present invention provide a subsystem that manages the replicated and migration capable state for an Enterprise Java Bean (EJB) application. This subsystem is further capable of upgrading the managed state schema of an application using state objects, while the application continues to process requests. In the following description, numerous specific details are set forth in order to provide a thorough understanding of the present invention. It will be apparent, however, to one skilled in the art that the present invention may be practiced without some or all of these specific details. In other instances, well known process steps have not been described in detail in order not to unnecessarily obscure the present invention.

Figure 1:
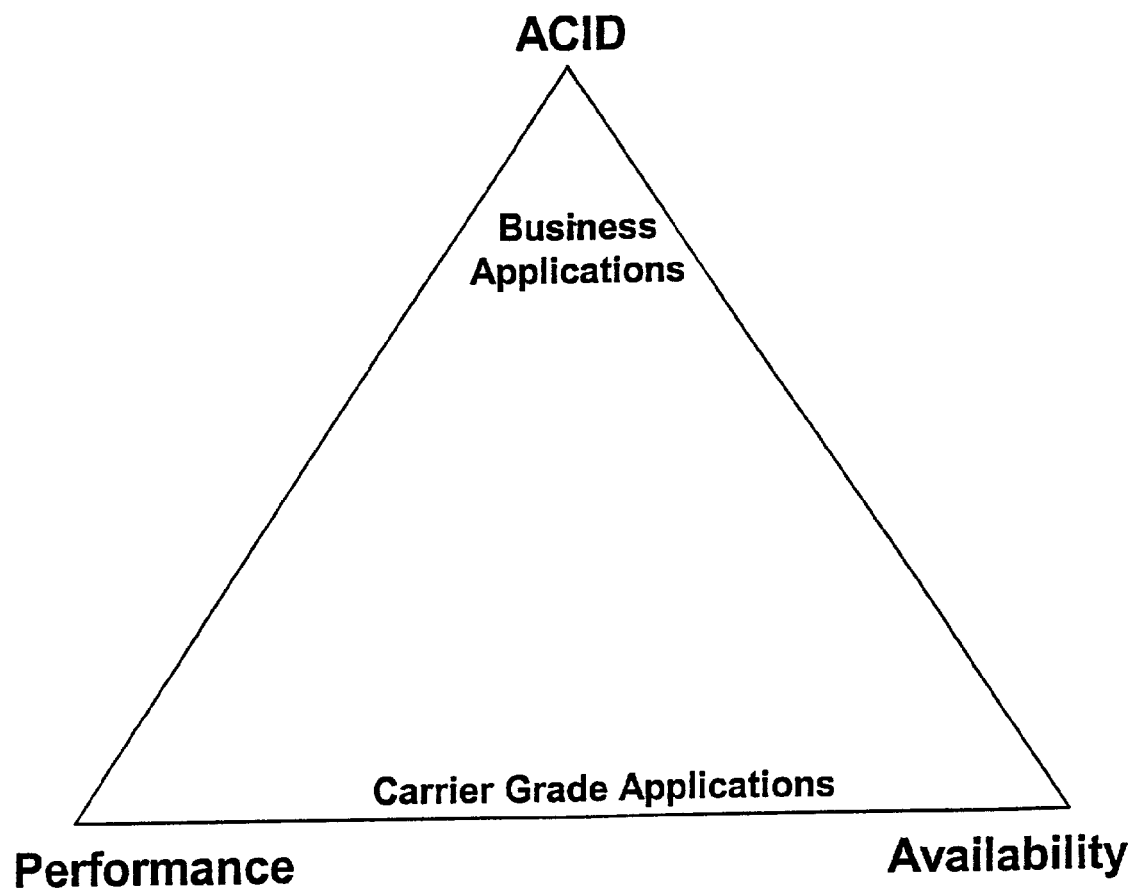
FIG. 1 is a diagram showing the tradeoffs that business and carrier grade applications have to make.
Figure 2:
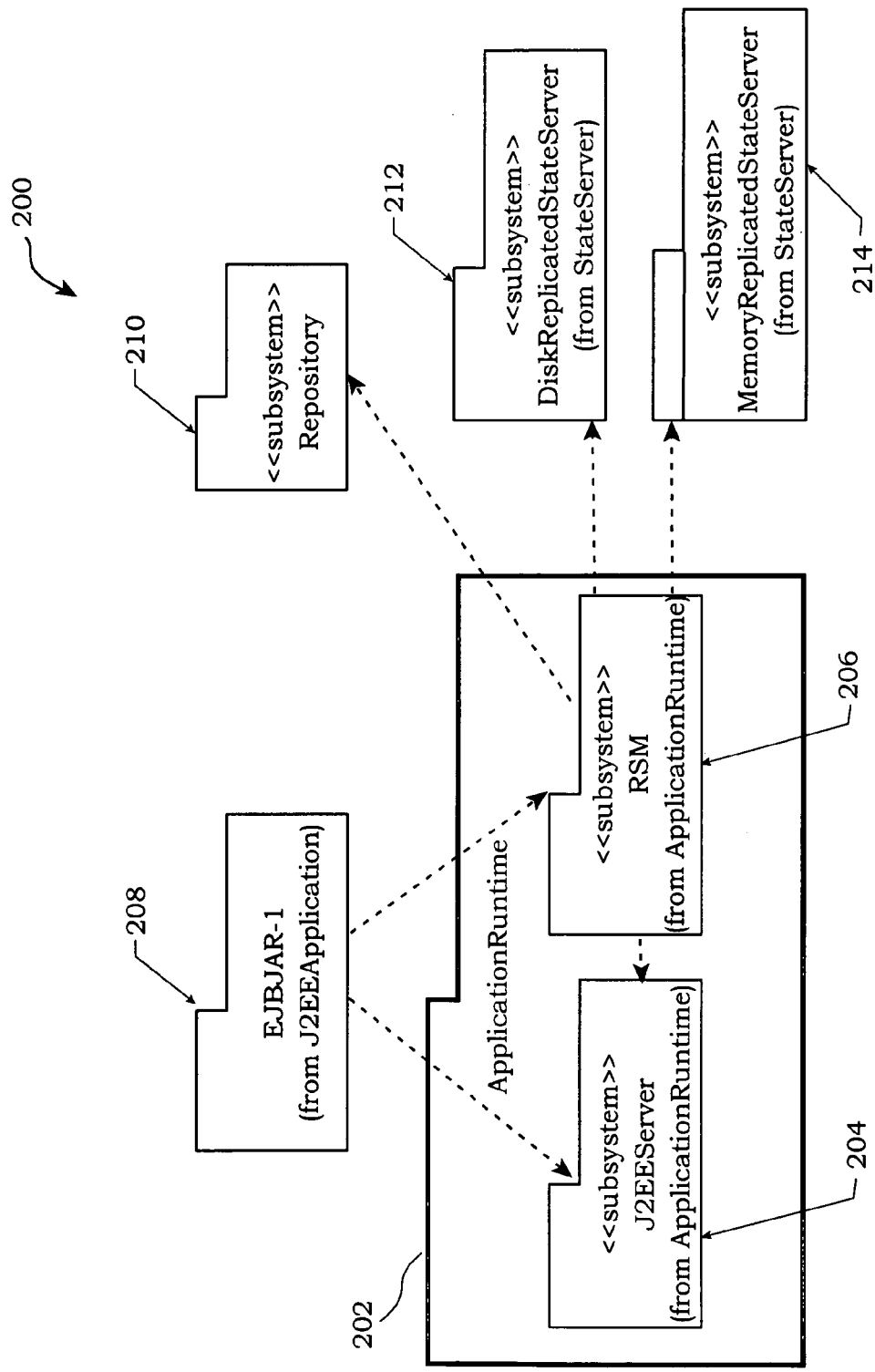
FIG. 2 is a Java system having state management, in accordance with an embodiment of the present invention.

FIG. 1 has been described in terms of the prior art. FIG. 2 is a Java system 200 having state management, in accordance with an embodiment of the present invention. The Java system 200 includes an application runtime subsystem 202 having a Java 2 Enterprise Edition (J2EE) Server 204 and a replicated state manager (RSM) subsystem 206. Also included in the Java system 200 are a Java application 208, a repository subsystem 210, a disk replicated state server subsystem 212, and a memory replicated state server subsystem 214.

FIG. 2 shows the RSM 206 interfacing with the (J2EE) Server 204, the Java application 208, the repository 210, the disk replicated state server subsystem 212, and the memory replicated state server subsystem 214. The J2EE Server subsystem 204 provides the runtime environment for J2EE applications, and includes implementations of different types of J2EE containers, such as an application client container, an EJB container, and a web container.

The Repository subsystem 210 stores and manages the software load for the J2EE application 208 and J2EE server 204. During pre-deployment of a J2EE application 208, classes and a deployment descriptor provided by an application developer are loaded into the repository 210, and later, loaded on to a J2EE server 204 to make the application 208 operational.

State server subsystems store and manage the replicated state for the J2EE application 208, which makes an application highly available. During application runtime, the RSM 206 replicates the replicated state to a state server. If the application 208 running on the J2EE server 204 fails, the application 208 restarts after failure by recovering its state from the replicated state server. The Java system 200 provides two types of state servers, a memory replicated state server 214 and a disk replicated state server 212. The memory replicated state server 214 stores the replicated state in an in-memory database, while disk replicated state server 212 uses a disk-based database to store and manage the replicated state.

As shown in FIG. 2, the RSM subsystem 206 is part of the J2EE Application Runtime subsystem 202, which is responsible for management and supervision of running the J2EE application 208. The RSM 206 manages the replicated and migration capable state for J2EE applications 208 that are running on a J2EE server 204. By managing application state, the RSM 206 provides support for online application upgrades, failure recovery and load balancing features of the J2EE system 200. The RSM 206 uses a memory database within a J2EE server process 204 to manage the application state. In this manner, the RSM enables an application to remain operational even if the state servers become temporary unavailable.

Figure 3:
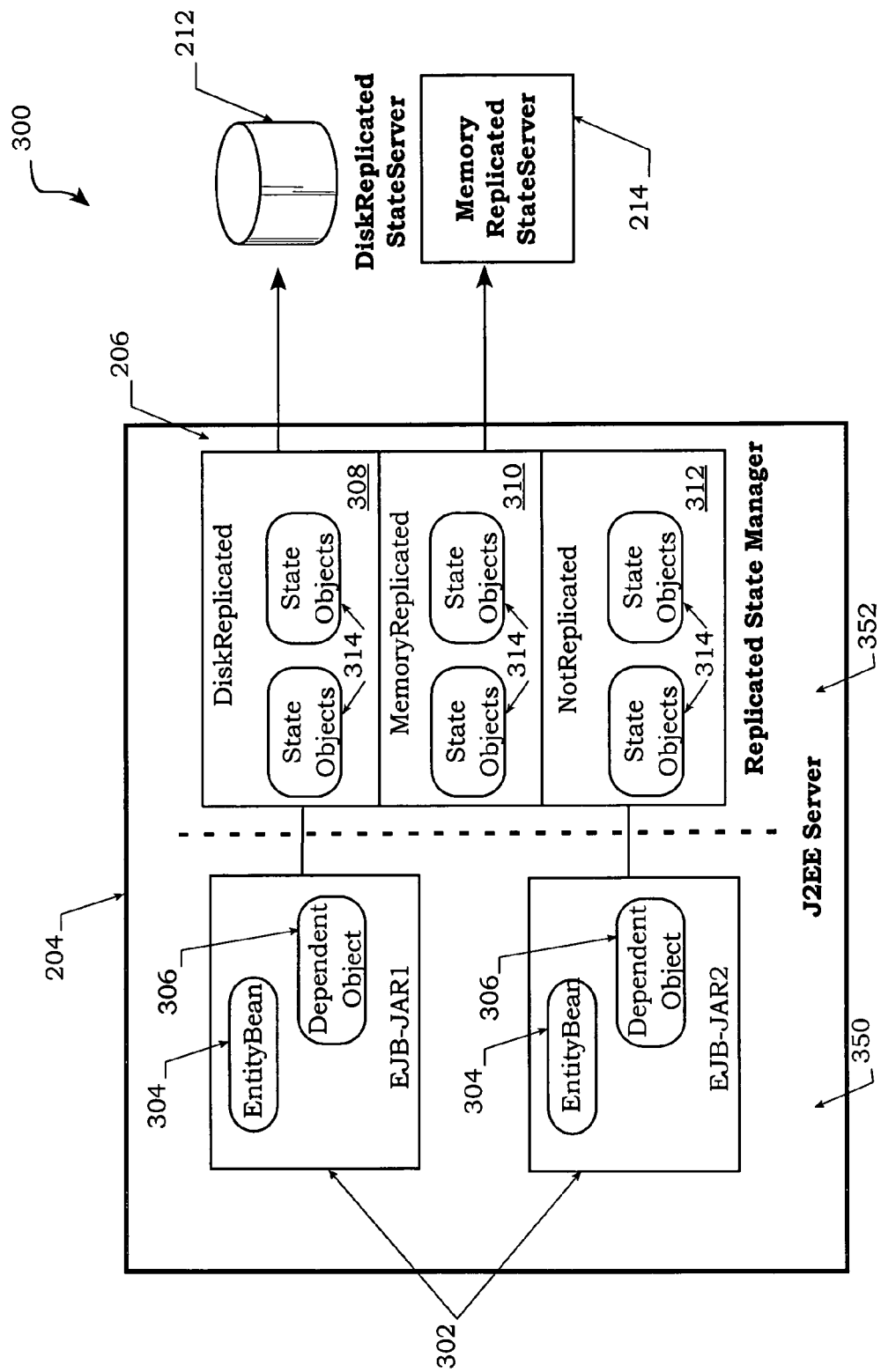
FIG. 3 is a block diagram showing replicated state subsystems, in accordance with an embodiment of the present invention.

FIG. 3 is a block diagram showing replicated state subsystems 300, in accordance with an embodiment of the present invention. The replicated state subsystems 300 show a J2EE server 204 in communication with a disk replicated state server 212, and a memory replicated state server 214. Based on the CMP model, the application developer develops a set of entity beans 304 for an application and specifies the relationships between these objects. For each entity bean 304, the application developer specifies an abstract schema that defines a set of methods for accessing the container-managed fields and relationships for the entity bean. These container-managed fields and relationships are specified in the deployment descriptor defined by the application developer.

Each entity bean 304 includes an abstract class, a local and/or remote interface that defines bean's client-view business methods, a home interface that defines create, remove, home and finder methods. The abstract schema includes a set of properties, with each property representing a field or relationship in the container-managed state of the entity bean 304. The entity bean 304 also defines a set of setter and getters methods for the container-managed fields and relationships. The application developer codes state access and modifications using the setter and getter methods defined for the container-managed fields and relationships.

The EJB 2.0 CMP specification sets forth, without specific implementations, goals for a persistence manager that provides management of persistent state and relationships for the entity beans 304. The embodiments of the present invention provide specific methods for state management that achieve the goals set forth by the EJB 2.0 CMP specification. Specifically, the RSM of the embodiments of the present invention is a carrier-grade J2EE specific implementation of a persistence manager facility.

However, instead of mapping an abstract schema to a database-based persistence mechanism, RSM manages the state of entity beans 304 and dependent objects 306 using an in-memory state management facility. This in-memory state manager runs within a J2EE server process. To support state recovery during an application restart and migration, the RSM actively replicates the in-memory state to disk replicated state servers 212 and/or memory replicated state servers 214.

FIG. 3 shows two EJB modules 302 deployed on a J2EE server process 204. Each EJB module 302 includes a set of entity beans 304. The RSM defines a separation between the application part 350 and managed state part 352.

The application part 350 includes abstract entity bean object classes 304 provided by application developer, based on the EJB 2.0 CMP model. The application part 350 also includes concrete implementation classes generated by the RSM. Further, the application part 350 provides the implementation of methods that provide the state transition logic for a J2EE application.

The Managed state part 352 includes the state objects 314 that capture the state of entity beans 304. The separation of state between application part 350 and managed state part 352 enables the RSM to support both application upgrade and migration.

The RSM of the embodiments of the present invention can generate concrete implementation classes for entity beans 304. The concrete classes generated by the RSM are responsible for managing the recoverable state of the entity beans 304. The RSM also provides implementation of collection classes that are used in managing container-managed relationships. By providing implementation of the getter and setter methods of the corresponding abstract classes, the RSM can implement the entity bean 304 classes. The RSM can also manage the mapping between primary keys and EJB objects, and can store the recoverable references to the remote and home interfaces of other EJBs.

The RSM further manages the relationships between entity beans 304. This includes maintaining the referential integrity of the container-managed relationships in accordance with the semantics of the relationship type.

The RSM manages the recoverable state of entity bean 304 based on the type of the state. Depending on the type of state, the RSM replicates the state in either a disk replicated state server 212 or a memory replicated state server 214. In addition, the RSM makes application state capable of migration from one J2EE server process 204 to another J2EE server process.

The RSM supports checkpoints of the recoverable state to the two types of state servers, namely, the disk replicated state server 212 and the memory replicated state server 214. This includes support for connecting to the servers, sending checkpoints, recovering replicated state and merging the recovered state into existing in-memory state. Further, the RSM recovers the replicated state from the state servers during application restart after a failure or shutdown or during migration of EJB module from one J2EE server process to another.

During pre-deployment of an EJB module 302, the RSM maps the abstract schema of entity beans 304 classes to a physical schema used by the RSM. To perform this form of schema mapping, the RSM can use a deployment descriptor of EJB components. The RSM generates concrete implementations for the entity bean 304 classes defined as abstract classes by the application developer. A concrete implementation class includes the code that implements the setter and getter methods for container-managed fields and relationships based on the RSM mechanism.

The embodiments of the present application allow state managed by the RSM for a J2EE application to be partitioned into multiple state partitions. In some embodiments of the present invention a state partition defines a unit of concurrency. In these embodiments, the RSM serializes access to a state partition from concurrent transactions. For example, using this embodiment, if a J2EE application includes multiple entity beans having states managed as part of a single state partition, then only a single transaction can be active across the entity bean instances in this state partition at any particular instance.

During application design, application designer partitions the replicated and migration capable state of an application using State Management Units of different types and State Partition. Such state partitioning may be specified using an application configuration descriptor or done dynamically through control module. The repository maintains a representation for the static partitioning of state using schema archives. Schema archives are described in greater detail in U.S. patent application Ser. No. 09/818,214, filed Mar. 26, 2001, and entitled "Method and Apparatus for Managing Replicated and Migration Capable Session State for A Java Platform," which is incorporated herein by reference in its entirety.

RSM partitions entity beans based on the range of primary keys that will be served by different state partitions. For example, account 1 to 100 will be managed within a single state partition 1, while account 101 to 200 will be managed in a separate state partition 2. A state partition also identifies the unit of concurrency. J2EE server process and RSM serialize transactional access to a state partition. At any specific instance, there can be only one transaction active on entity beans within a state partition.

After partitioning state in to State Partitions, application designer partitions each state partition in to multiple State Management Units. A state partition can contain multiple state management units (SMU) of different types.

Figure 4:
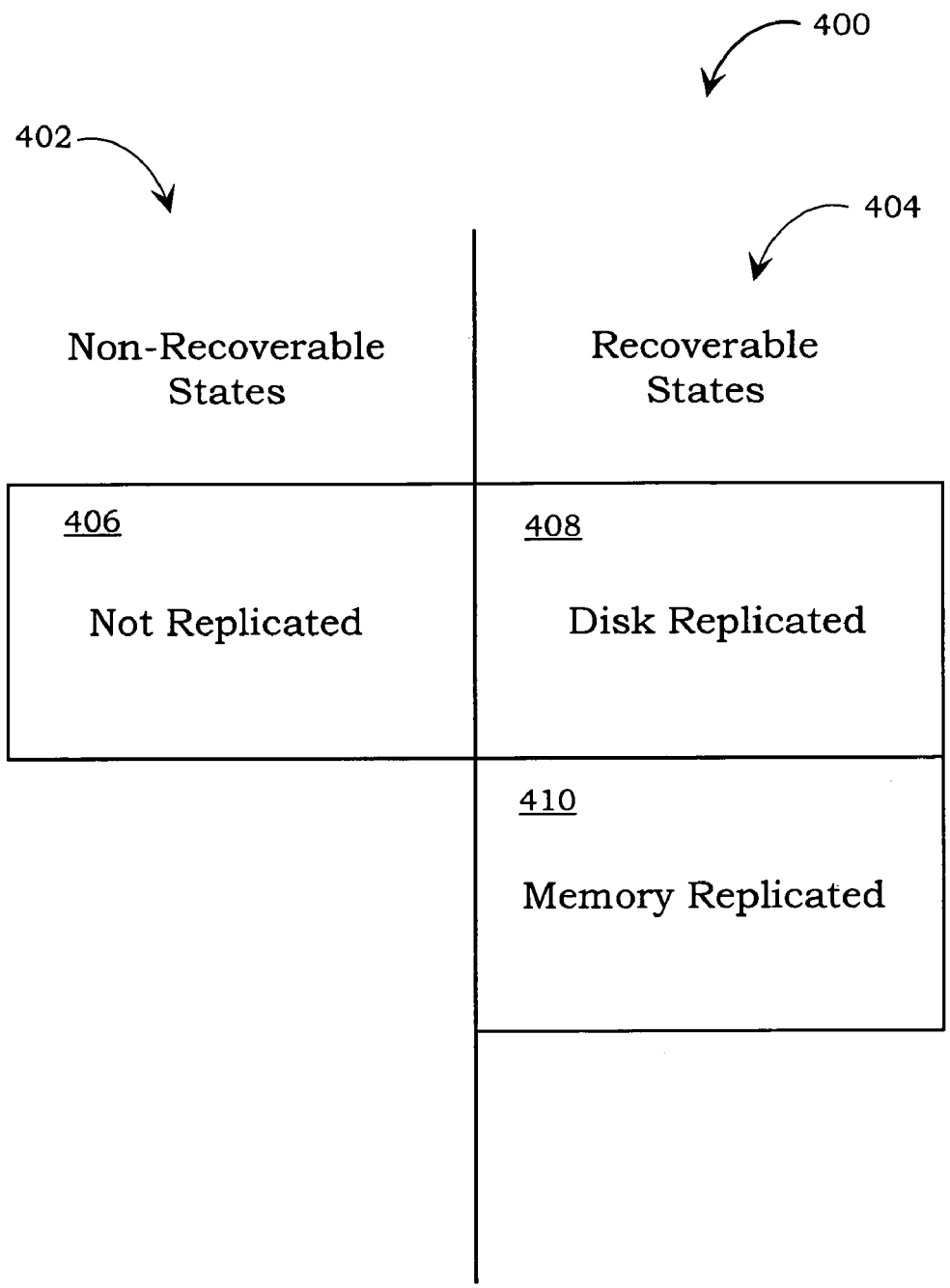
FIG. 4 is a diagram showing state management types for state management units (SMU), in accordance with an embodiment of the present invention.

FIG. 4 is a diagram showing state management types 400 for state management units (SMU), in accordance with an embodiment of the present invention. The state management types 400 are divided into a non-recoverable state 402 and recoverable states 404. The non-recoverable state 402 includes a non-replicated state 406. The recoverable states include a disk replicated state 408 and a memory replicated state 410.

A SMU is a collection of state objects 314 with the same state management type 400, and further defines a unit of checkpoints for the recoverable state types 404. An application can include multiple SMUs of different types depending on the specific requirements of the application. The RSM replicates a disk replicated SMU 408 to a disk replicated state server 212. The RSM is then capable of automatically recovering the disk replicated SMU 408 during an application restart after failure, shutdown or migration.

The RSM replicates a memory replicated SMU 410 to a memory replicated state server 214, and is then capable of automatically recovering memory replicated SMU 410 during an application restart after failure, shutdown or migration. The not replicated SMU 406 is not replicated by the RSM to either a disk replicated state server or a memory replicated state server. Generally, the RSM manages a non-replicated SMU 406 to support the migration state of a J2EE application from one J2EE server process to another.

Figure 5:
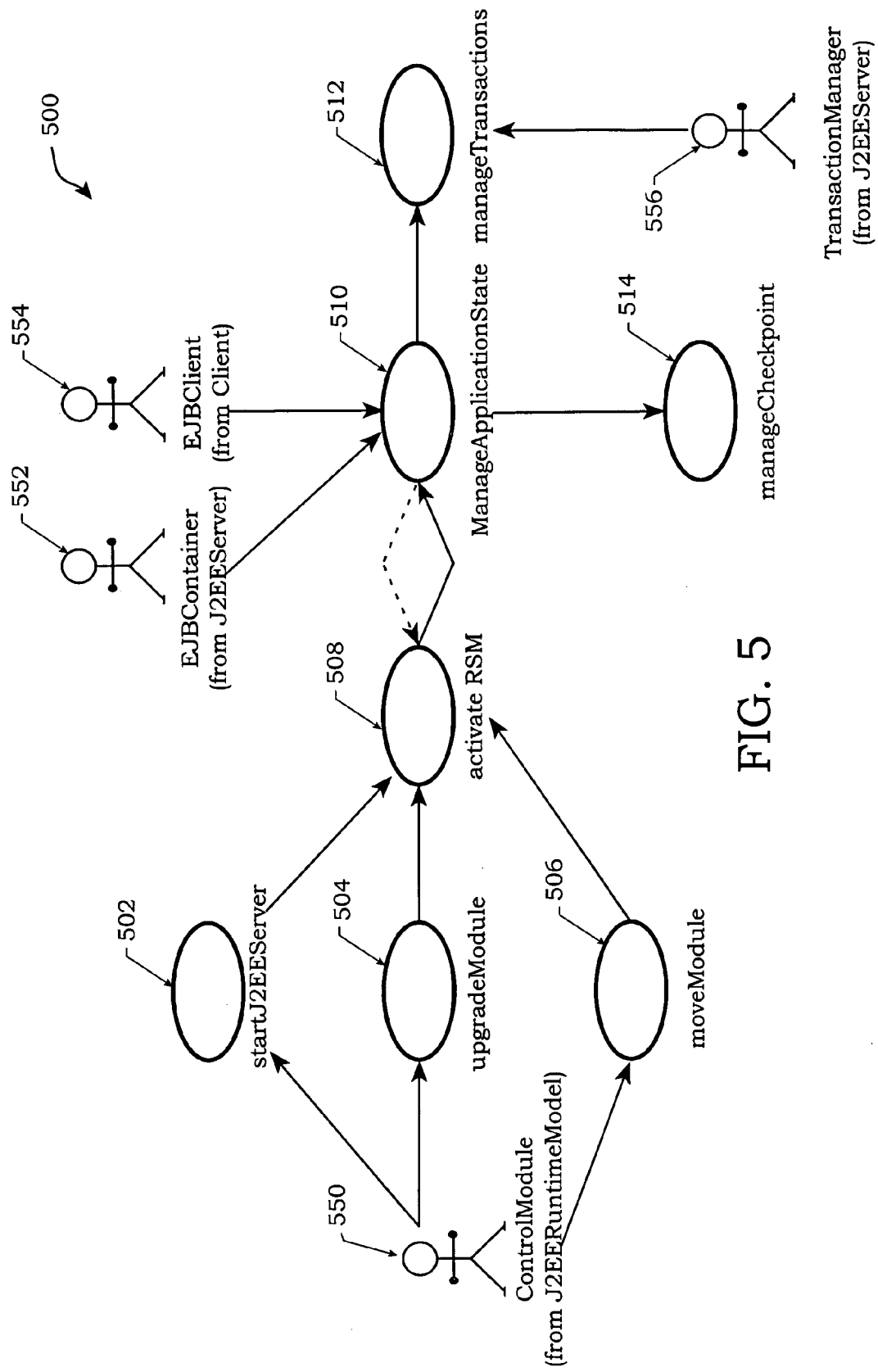
FIG. 5 is an illustration showing a hierarchy of use operations for an RSM, in accordance with an embodiment of the present invention.

FIG. 5 is an illustration showing a hierarchy of use cases 500 for an RSM, in accordance with an embodiment of the present invention. During application runtime, a Control Module 550, an EJB Container 552, a Transaction Manager 556, and an EJB Client 554 are the actors that drive use cases for the RSM.

The control module 550 is a part of a Java application that provides control and application-specific policies for the application. The control module 550 is described in greater detail in related U.S. patent application Ser. No. 09/812,536, filed Mar. 19, 2001, and entitled "Method and Apparatus for Providing Application Specific Strategies to a Java Platform including Start and Stop Policies," which is incorporated by reference in its entirety. The control module 550 is responsible for supervising the J2EE server 204 and the EJB modules at application runtime. Since the RSM is part of application runtime for a J2EE server process 204, J2EE server 204 activates the RSM as part of the start J2EE server process 502, the upgrade module process 504, and the move module process 506. The control module 550 interacts with the J2EE server 204, which in turn drives uses cases for RSM.

The EJB client 554 invokes a method on an entity bean that has its state managed by the RSM using a manage application state process 510. Such method invocation generally happens under a transaction, and drives the RSM to manage any changes to the entity bean's state as part of the invocation. The EJB container 552, which is part of J2EE server 204, intercepts the method invocation to inject its services, for example, the container 552 can start a transaction that brackets a method invocation. After injecting its services, the container 552 dispatches method invocation to the target entity bean instance. The EJB container 552 interfaces with the RSM to drive the manage transactions use case 512, the manage application state use case 510, and the manage checkpoints use case 514. Finally, the transaction Manager 556 manages transactions for the RSM, which acts as a transactional resource manager.

The RSM uses the manage application state use case 510 to manage state for an EJB-based application. The RSM acts as a carrier-grade implementation of the persistence manager facility defined in the EJB 2.0 specification. CMP model uses the RSM to manage replicated and migration-capable state for entity bean.

Initially, the EJB client 554 makes an invocation on a method defined as part of the remote or local interface of the target entity bean. Typically, a method invocation maps to a state transition implemented by the entity bean. Based on the CG J2EE programming model, a method invocation on an entity bean can be either local or distributed, synchronous or asynchronous, but preferably does not have any affect on how the RSM manages state for an invoked entity bean instance.

The EJB container 552 then intercepts the method invocation from the EJB client. The EJB container 552 uses this interception to inject container-specific services, such as, transaction bracketing and security mapping. As part of the method implementation, abstract entity bean classes provided by the application developer invoke setter and getter methods for container-managed fields and relationships. A concrete implementation class is then generated by the RSM and implements the setter and getter methods. This enables the RSM to manage the state of container-managed fields and relationships as part of its implementation. The RSM manages the state of entity beans using an in-memory state management facility, which runs within a J2EE server process.

When an entity bean undergoes state transitions initiated by a client application, the application changes the state objects. Any changes to the managed state part are tracked by the RSM. Depending on the state management requirements specified for a J2EE application, the RSM replicates the state objects to disk replicated and memory replicated state servers.

The RSM uses the manage checkpoint process 514 to manage checkpoints of replicated state, and then issues checkpoints to the state servers. More specifically, the RSM implements a checkpoint mechanism that is configurable using a checkpoint policy, which can be specified by the application Control Module 550. The RSM then uses the checkpoint mechanism to replicate state to the disk replicated state server and the memory replicated state server.

The RSM can issue checkpoints at different points, such as at the successful commit of each transaction. Generally, no checkpoint is issued for a transaction that fails to commit and is rolled back. This ensures that the state is replicated to state servers for only committed transactions leading to consistent recovery after failure, migration or shutdown. The RSM can optimize the checkpoint mechanism by combining transactions from successful commits of multiple transactions, and maintaining a sequence of box-carried checkpoints. This is referred to as boxcarring of checkpoints for multiple transactions.

Further, the checkpoint can be issued either synchronously or asynchronously. The synchronous checkpointing increases the reliability associated with the checkpointing mechanism. The state server ensures that checkpoints propagated to it are processed, thereby avoiding any potential loss of checkpoints. The replicated state in the state servers stays identical with the in memory state managed by RSM, ensuring a faster recovery during the failover.

In the asynchronous checkpoint mechanism, the RSM on the J2EE server process can enqueue checkpoints on a local message queue, thus the checkpoint messages are placed in the local address space before getting dispatched. The checkpoint operation returns immediately after the enqueuing operation allowing the on-going transaction to complete.

The message queue takes the responsibility of delivering the checkpoint messages to the state server at some time later after the transaction has been successfully committed. Preferably, the message queue preserves the ordering of the checkpoint messages in the order that transactions were executed on the application.

Asynchronous checkpointing adds more flexibility to the state replication mechanism. Based on the checkpointing policy, the message queue can take decision to propagate asynchronous checkpoints at different intervals—after each committed transaction, after a set of committed transactions or after a defined time interval.

Figure 6:
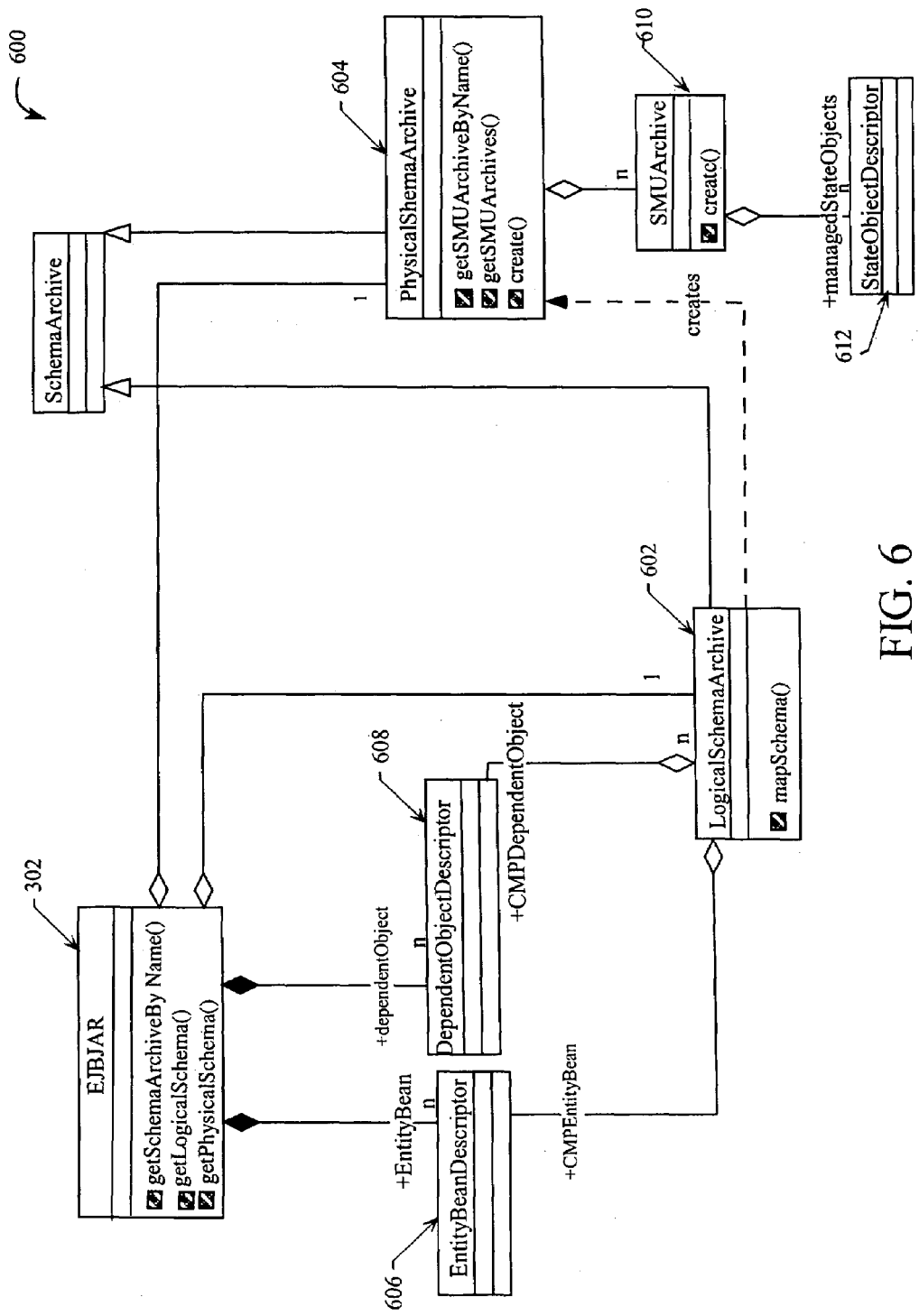
FIG. 6 is a class diagram showing repository interfaces used by the RSM, in accordance with an embodiment of the present invention.

FIG. 6 is a class diagram showing repository interfaces 600 used by the RSM, in accordance with an embodiment of the present invention. The repository maintains classes and configuration descriptors that represent partitioning of state for a J2EE application. The repository interfaces 600 includes EJB modules 302, a logical schema archives 602, a physical scheme archives 604, entity bean classes 606, dependent object descriptor 608, SMU archives 610, and state object classes 612.

The RSM maintains both a logical schema archive 602 and a physical schema archive 604 for each EJB module 302, which are populated in the repository 210 during pre-deployment of an EJB module 302. More specifically, during pre-deployment of the EJB module 302, the RSM creates a logical schema archive 602 in the repository, which includes abstract classes for entity beans 606. The logical schema archive 602 also includes concrete implementation classes that are generated by the RSM. The RSM maps the logical schema archive of a pre-deployed J2EE application to the application part at runtime.

The physical schema archive 604 includes the state object classes 612 and RSM-generated artifacts used for the managed state part of a J2EE application. The SMU archive 610 groups state object classes 612 based on the state management type. Multiple SMU archives 610 can be included within a physical schema archive 604. Both logical and physical schema archives are loaded in the repository as part of application software load.

As previously mentioned, the embodiments of the present invention can perform online upgrades to schema for both session and application-specific managed state, while the application continues to process new requests. Specifically, the embodiments of the present invention can be used in service-provider environments that require a mechanism to perform online upgrades of an application. Using the embodiments of the present invention, a system can continue to provide services to clients while a software upgrade is being performed. Advantageously, the embodiments of the present invention allow an online upgrade to occur generally without any detectable impact on the clients using the services provided by the application during the upgrade.

Figure 7:
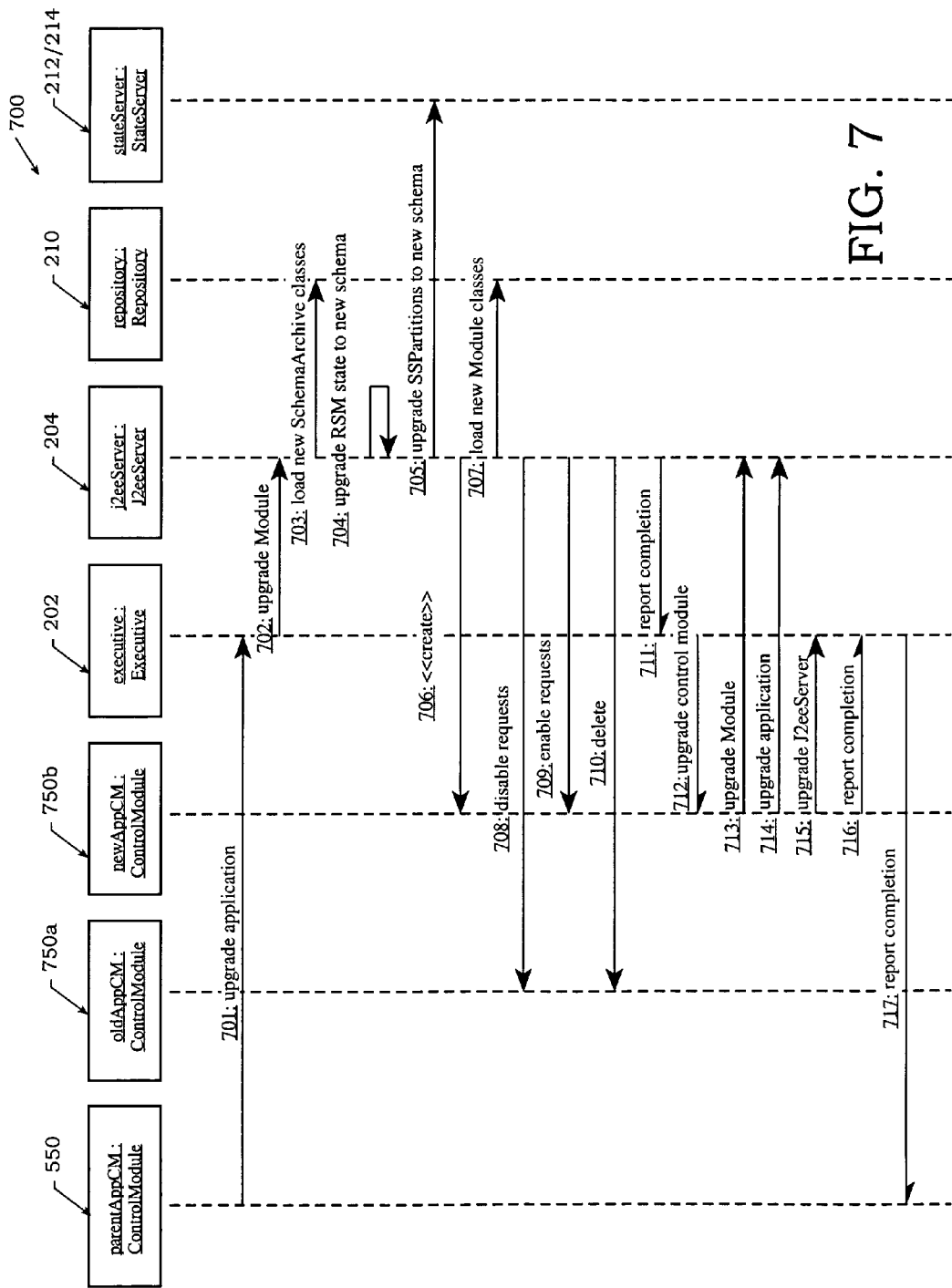
FIG. 7 is a sequence diagram showing an application upgrade sequence, in accordance with an embodiment of the present invention.

FIG. 7 is a sequence diagram showing an application upgrade sequence 700, in accordance with an embodiment of the present invention. The application upgrade sequence 700 illustrates how a parent application's control module 550 upgrades a child application. Broadly speaking, the child application's control module is upgraded in-place. Then, the child application's control module upgrades the application's J2EE servers, service modules, and child applications.

More specifically, in operation 701, the parent application's control module 550 requests the executive 202 to upgrade a child application. Advantageously, the request can include optional application-specific data that the executive 202 will pass to the target application's control module. Next, in operation 702, the executive 202 requests the J2EE Server 204 running the application's old control module 750a to upgrade the old control module 750a.

In response, the J2EE Server 204 begins the upgrade by loading the class files for the upgraded physical RSM schema of the control module from the repository 210, in operation 703. The J2EE Server 204, in operation 704, then performs an online upgrade of the control module's state to the new physical schema. The J2EE Server 204 also upgrades the control module's state server partitions in the state server 212/214 to the new state schema, in operation 705.

The J2EE Server 204 then creates a new instance 750b of the old control module 750a, in operation 706, and loads the new class files for the new control module 750b, in operation 707. After loading the new class files, the J2EE Server 204, in operation 708, disables requests to the old control module 750a, and enables requests to new control module 750b, in operation 709. In this manner, requests from other application modules or from external applications can now be directed to the new control module 750b. The J2EE Server 204 then deletes the old control module 750a, in operation 710, and reports completion to the executive 202, in operation 711.

In operation 712, the executive 202 requests the new control module 750b to continue the upgrade. In response, the new control module 750b upgrades all child J2EE Servers, in operation 713. The new control module 750b also upgrades all application service modules, in operation 714, and upgrades all child applications by recursively using the application upgrade sequence 700, in operation 715.

When all the application's service modules, child J2EE servers, and child applications have been upgraded, the new control module 750b reports completion to the executive 202, in operation 716. The completion message may include optional application-specific data to be passed to the parent application's control module 550. Then, in operation 717, the executive 202 reports completion to parent applications control module 550, passing the application-specific data from the new control module 750b.

Figure 8:
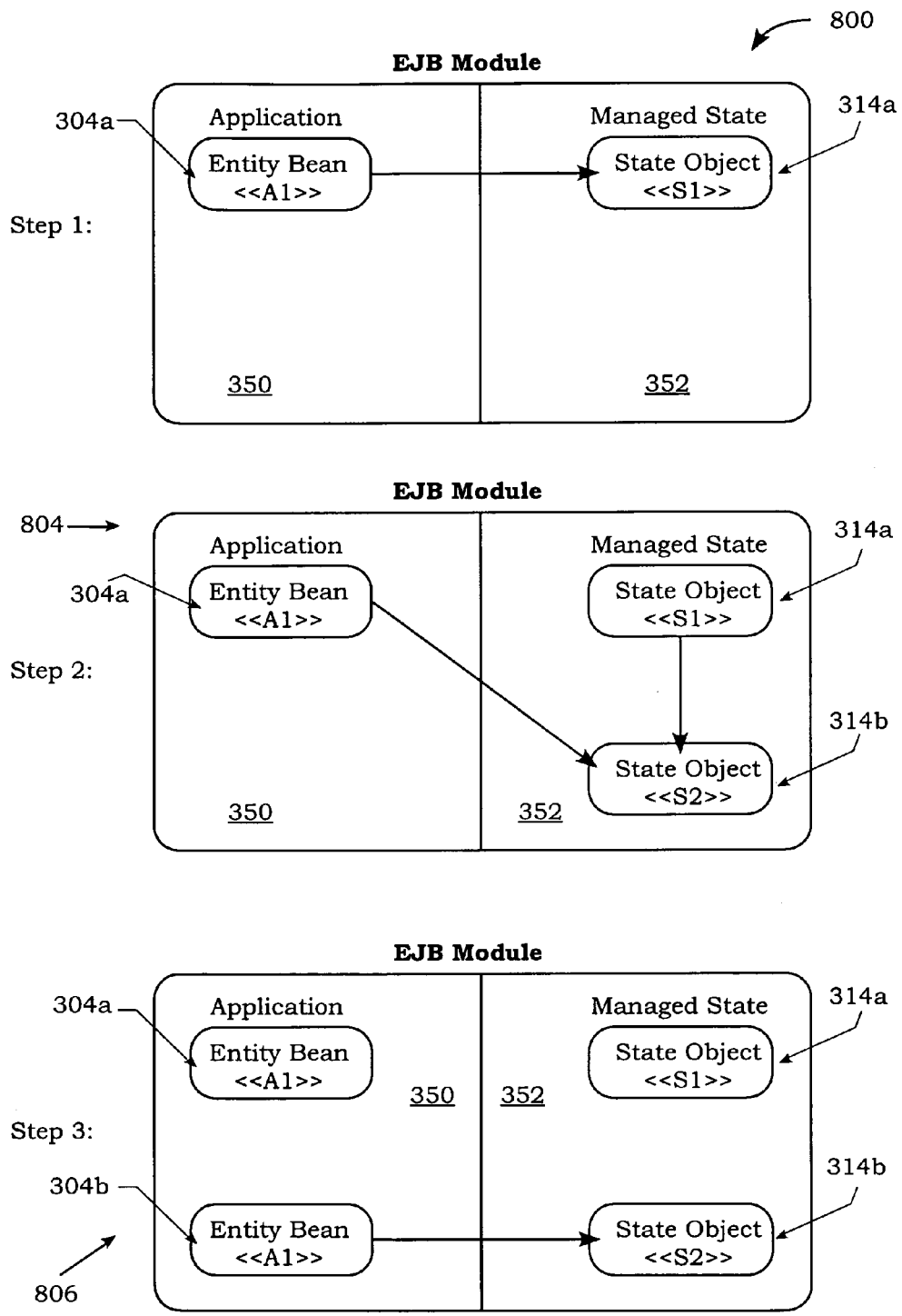
FIG. 8 is a diagram showing upgrade operations for upgrading the managed state of an application, in accordance with an embodiment of the present invention.

FIG. 8 is a diagram showing upgrade operations 800 for upgrading the managed state of an application, in accordance with an embodiment of the present invention. The upgrade operations 800 illustrate how the RSM upgrades the state of an EJB module as part of module upgrade. As discussed above, the application control module supervises the upgrade of an EJB module by interacting with the J2EE server, which in turn drives the use cases for the RSM.

In operation 802, an EJB module having an application part 350 and a managed state part 352 is executed. The application part 350 includes a plurality of entity beans, of which entity bean 304a is a member. Similarly, the managed state part 352 of the EJB module includes a plurality of state objects, of which state object 314a is a member. As illustrated, state object 314a maintains the managed state of the entity bean 304a. To upgrade the EJB module, the RSM begins by upgrading the managed state of the EJB module, as discussed next in operation 804.

In operation 804, the RSM performs an online upgrade of the managed state part 352 for the EJB module. This includes upgrading of existing physical schema to the upgraded physical schema archive. RSM uses the repository to load the upgraded physical schema archive. The RSM also upgrades the state contained in the SMUs. The RSM takes responsibility of transferring the state from existing state objects 314a to upgraded state objects 314b without disrupting module operation. In particular, after creating an upgraded state object 314b, the RSM uses the new upgraded state object 314b to maintain state for the entity bean 304a.

The J2EE server then takes the responsibility of upgrading the application part 350 of the EJB module, in operation 806. During the upgrade of the application part 350, the existing EJB module continues to process method invocations using the upgraded managed state objects 314b. As discussed above with reference to FIG. 7, the J2EE Server creates an upgraded entity bean 304b for each old entity bean 304a. Then, the J2EE server disables the existing entity bean 304a and enables the upgraded entity bean 304b. During this switchover, J2EE server waits for pending requests on running EJB module to drain before switching. Thus EJB module is upgraded with minimal downtime.

Figure 9:
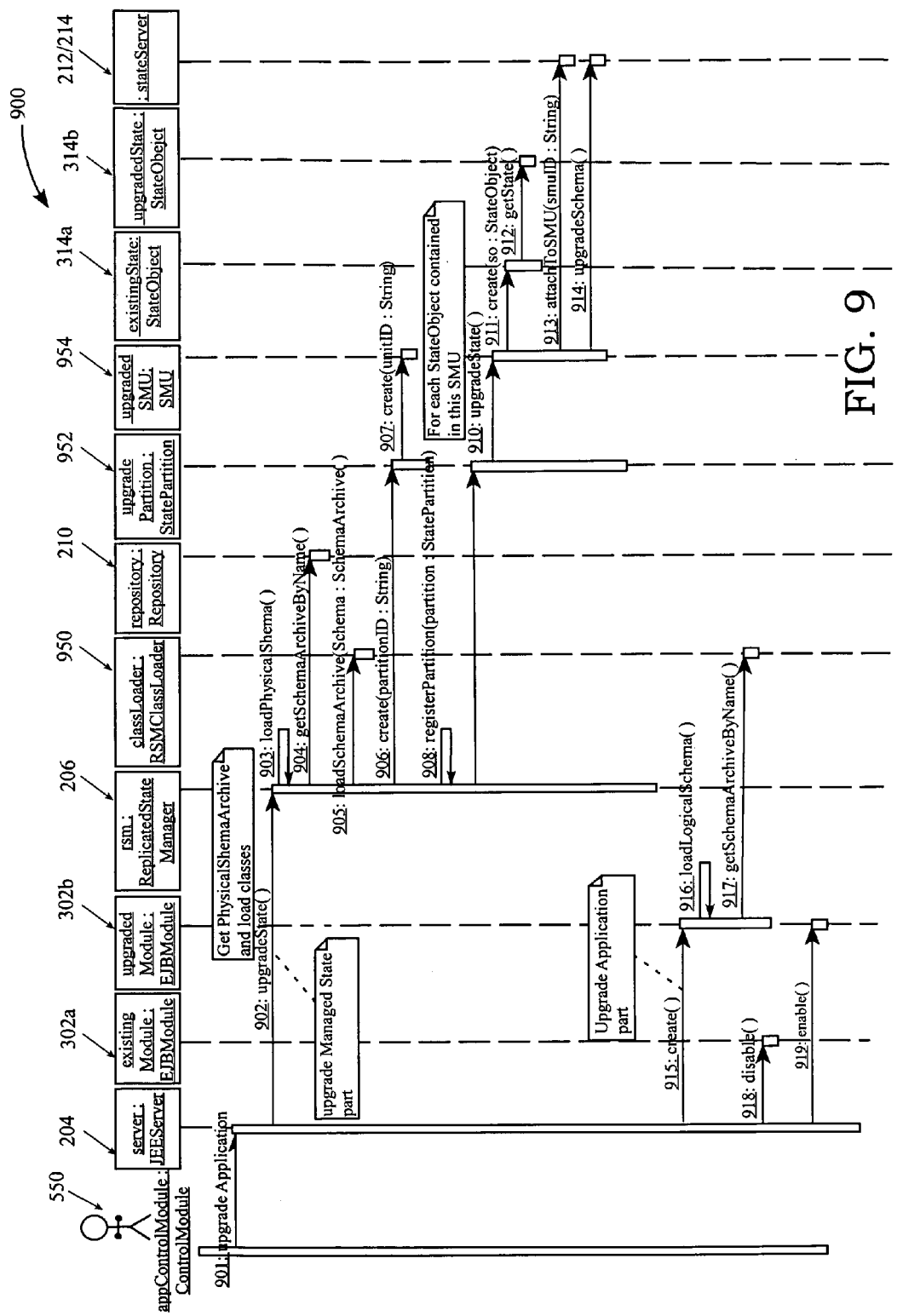
FIG. 9 is a sequence diagram showing an upgrade managed state sequence, in accordance with an embodiment of the present invention.

FIG. 9 is a sequence diagram showing an upgrade managed state sequence 900, in accordance with an embodiment of the present invention. The upgrade managed state sequence 900 illustrates how the RSM upgrades the managed state for an EJB module. In operation 901, the applications control module 550 requests the J2EE server 204 to upgrade an existing EJB module 302a. In response, the J2EE server 204 initiates upgrade of the managed state part for the existing EJB module 302a by requesting the RSM 206 to upgrade the managed state part of the EJB module, in operation 902.

In operations 903 and 904, the RSM 206 loads the upgraded Physical Schema Archive for the EJB module from the repository 210, and in operation 905, the RSM 206 loads the Physical Schema classes from the class loader 950. In operations 906, 907, and 908, the RSM 206 creates the upgraded State Partitions and SMUs based on the physical schema specification. In addition, the RSM 206 initiates upgrade of created SMUs and state objects contained within the SMUs.

Next, in operations 909, 910, 911, and 912, the RSM 206 creates an instance of an upgraded state object class, such as a new version of OrderState class with an upgraded set of fields as defined by a compatible upgrade. The RSM 206 then transfers the state from instances of the existing state object class to those of upgraded state object class. It should be noted that transfer of the state accounts for any changes in the schema of two state object class.

Once the state transfer is completed for an upgraded SMU from an existing SMU, the RSM 206 discards the old SMU and its state objects. The, RSM 206 then begins using the upgraded SMU to manage state. After the state upgrade is completed for a SMU, the RSM 206 upgrades the schema in the state servers for the upgraded SMU and state object classes, in operations 913 and 914. In this manner, the RSM 206 upgrades all the SMUs for the EJB module.

After completing the state upgrade, the J2EE server 204 takes the responsibility of upgrading application part of the EJB module 302a, in operation 915. This includes the operations of loading new logical schema for upgraded EJB module 302b, in operation 916, loading new physical schema for upgraded EJB module 302b, in operation 917, disabling existing EJB module 302a, in operation 918, and enabling the upgraded EJB module 302b, in operation 919. Advantageously, the embodiments of the present invention allow online upgrades to the managed state of a Java application. Further, the embodiments of the present invention allow upgrades to the application without disrupting the functionality of the application during the online upgrading process.

Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims.

What is claimed is:

1. A method for upgrading managed state for a JAVA based application, comprising:

executing a JAVA module on a server, wherein the JAVA module is in a middle-tier between a client browser and databases, the JAVA module including at least one original entity bean and at least one original state object in communication with the original entity bean, the original state object storing a state of the original entity bean, the state of the original entity bean being associated with one or more fields defined by an abstract schema, wherein the abstract schema is capable of being mapped to a physical schema;

generating an upgraded state object, the JAVA module including the upgraded state object, wherein the upgraded state object is generated by upgrading the physical schema using data stored in a system repository that is part of the databases;

transferring the state stored in the original state object to the upgraded state object without disrupting the operation of the JAVA module, wherein the original state object is upgraded in the JAVA module;

generating an upgraded entity bean using data stored in the system repository; and providing state management for the original entity bean using the upgraded state object.

2. A method as recited in claim 1, further comprising the operation of managing the state of the upgraded entity bean using the upgraded state object.

3. A method as recited in claim 2, wherein both the original entity bean and the original state object are disabled.

4. A method as recited in claim 1, wherein the state of the original entity bean is further associated with one or more relationships defined by the abstract schema.

5. A method as recited in claim 1, wherein functionality of the JAVA application is not disrupted when the JAVA module is upgraded.

6. A JAVA platform capable of performing an online upgrade on a JAVA application, the JAVA platform comprising:

a JAVA module in a middle tier between a client browser and databases, the JAVA module including at least one original entity bean and at least one original state object in communication with the original entity bean, the original state object storing a state of the original entity bean, the state of the original entity bean being associated with one or more fields defined by an abstract schema, and wherein the state object provides state management for the original entity bean; and a repository that is part of the databases and having upgraded class files for the original entity bean and upgraded class files for the original state object, wherein the original state object is upgraded by generating an upgraded state object, the JAVA module including the upgraded state object, using upgraded class files from the repository, and transferring the state stored in the original state object to the upgraded state object without disrupting the operation of the JAVA module, wherein the original state object is upgraded in the JAVA module; and an upgrade entity bean is created using data from the repository as the JAVA platform is upgraded.

7. A JAVA platform as recited in claim 6, wherein the state of the upgraded entity bean is managed using the upgraded state object.

8. A JAVA platform as recited in claim 7, wherein both the original entity bean and the original state object are disabled.

9. A JAVA platform as recited in claim 6, wherein the upgraded state object is generated by upgrading a physical schema using data stored in the repository.

10. A JAVA platform as recited in claim 6, wherein the state of the original entity bean is further associated with one or more relationships defined by the abstract schema.

11. A JAVA platform as recited in claim 6, wherein functionality of the JAVA application is not disrupted when the JAVA module is upgraded.

12. A method for upgrading a JAVA application having a managed application state, comprising the operations of:

executing a JAVA module on a server, wherein the JAVA module is in a middle tier between a client browser and databases, the JAVA module includes at least one original entity bean and at least one original state object in communication with the original entity bean, the original state object storing a state of the original entity bean, the state of the original entity bean being associated with one or more fields defined by an abstract schema;

generating an upgraded state object, the JAVA module including the upgraded state object, using data stored in a system repository that is part of the databases;

transferring the state stored in the original state object to the upgraded state object, without disrupting the operation of the JAVA module, wherein the original state object is upgraded in the JAVA module;

providing state management for the original entity bean using the upgraded state object;

generating an upgraded entity bean using data stored in the system repository;

providing state management for the upgraded entity bean using the upgraded state object; and disabling both the original entity bean and the original state object.

13. A method as recited in claim 12, wherein the upgraded state object is generated by upgrading a physical schema using data stored in the repository.

14. A method as recited in claim 12, wherein the state of the original entity bean is further associated with one or more relationships defined by the abstract schema.

15. A method as recited in claim 12, wherein functionality of the JAVA application is not disrupted when the JAVA module is upgraded.

16. A method as recited in claim 12, wherein the original state object and the upgraded state object are respectively classified into a particular state management unit.

17. A method as recited in claim 16, wherein the particular state management unit is used to facilitate upgrading of the original state object.

* * * * *